Oct. 14, 1969  P. K. ISAACS  3,472,658
PREPARING A READILY WETTABLE COCOA-SUGAR COMPOSITION
Filed June 30, 1966
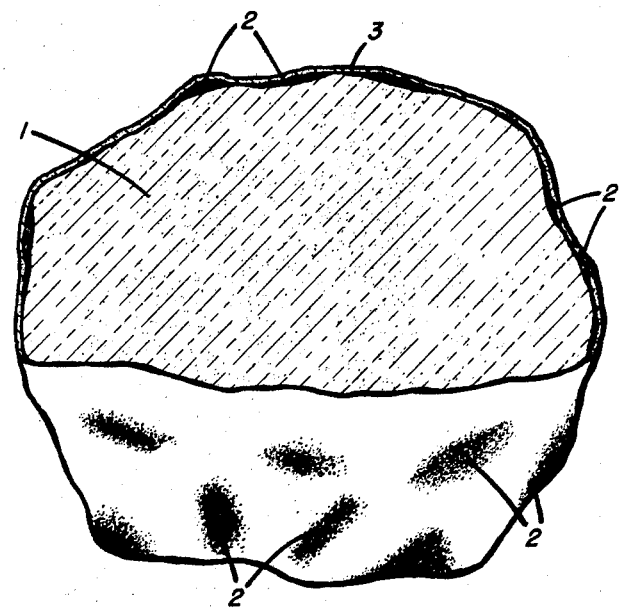
PHILIP K. ISAACS
INVENTOR
BY Francis H. Duef
ATTORNEY

United States Patent Office 3,472,658
Patented Oct. 14, 1969

3,472,658
PREPARING A READILY WETTABLE COCOA-SUGAR COMPOSITION
Philip K. Isaacs, Silver Spring, Md., assignor to W. R. Grace & Co., New York, N.Y., a corporation of Connecticut
Filed June 30, 1966, Ser. No. 561,921
Int. Cl. A23g 1/00; A23l 1/22
U.S. Cl. 99—26                                    6 Claims

ABSTRACT OF THE DISCLOSURE

A readily wettable cocoa-sugar composition is prepared by mixing water, cocoa powder, and sugar while maintaining the mixture at a temperature below 10° C. and thereafter drying the mixture.

---

The present invention relates to a novel and useful cocoa composition and a process for preparing same. More particularly, it relates to a cocoa and sugar composition which is easily wettable and a process for preparing the composition.

The use of a cocoa and sugar mixture for the preparation of hot and cold drinks is well known in the art. However, such mixtures are not readily wettable and disperable in cold water and/or milk. Accordingly, it is the usual practice to add a wetting agent, such as lecithin, in amounts up to about 5% in order to form a fast wetting mixture. Another method of forming such a readily wettable mixture is by the treatment of the cocoa and sugar with superheated steam in special towers. Both processes have inherent disadvantages since lecithin contributes an off-flavor and tends to cause caking upon prolonged storage while the steam treatment is expensive and yields a product of very low bulk density.

It is an object of the present invention to provide a readily wettable cocoa and sugar composition. A further object is to provide a product which is free-flowing and which is substantially non-caking in storage. A still further object is to provide a product having a high bulk density. Another object it to provide a process for forming a cocoa and sugar composition which is easily wettable. Other objects will become apparent as the description of the invention proceeds.

These objects are accomplished by the present invention which provides a readily wettable cocoa composition comprising from about 10 to about 60% by weight of cocoa and from about 90 to about 40% by weight of sugar with most of the cocoa in the composition being coated onto the surface of the sugar particles with the cocoa in turn being coated with a thin glassy layer of sugar, the particles of said composition having a bulk density of from about 0.6 to about 1.0 and a size of —20 and +150 mesh.

In a preferred embodiment of the present invention the cocoa is present in amounts of from about 10 to about 50%, more preferably from about 15 to about 25%, and substantially all of the cocoa is coated onto the surface of the sugar particles. In another embodiment, the cocoa has a fat (cocoa butter) content of from about 10 to about 20% and the particles in the composition have a bulk density of from about 0.8 to about 0.95 and a size of —50 and +100 mesh. In a still more preferred embodiment, the particles have a size of —60 and +80 mesh.

The present invention also provides a process for forming a readily wettable cocoa composition which comprises mixing from about 4 to about 12% by weight of water a composition containing from about 10 to about 60% by weight of cocoa powder and from about 90 to about 40% by weight of sugar while maintaining the mixture at a temperature below about 10° C. and thereafter drying mixture. Preferably, the water is used in amounts of from about 6 to about 11% and more preferably 8 to 10%.

In a preferred embodiment of the present invention the mixing is accomplished by tumbling, and the drying of the mixture is accomplished below about 34° C. by utilizing either dry air or a silica gel with agitation. The drying preferably takes place at a temperature below about 34° C. in order to prevent the melting of the fat (cocoa butter) in the cocoa. Otherwise, the fat will exude to the surface of the particles and cause poor wetting after extended storage.

The term "cocoa" is used to signify the powder which results from the crushing, grinding and pressing of the cocoa beans. In general, the cocoa particles will pass a 100 mesh screen and have a fat (cocoa butter) content of from about 10 to about 20%. In some instances, the cocoa is completely defatted which renders it even more easily wettable. The term "sugar" is used in its conventional sense to mean the sweetening agent derived from sugar cane, sugar beets and the like. Chemically, the term includes the common sugars such as sucrose and glucose. It also includes other sugars such as fructose and the like. The sugars in general have a bulk density of about 1 and will be 10 and +150 mesh. The "thin glassy layer of sugar" is used to signify a layer having a glossy smooth surface and is probably composed of amorphorus rather than crystalline sugar. The bulk density referred to is given in grams/cc. and the expression "—20 and +150 mesh" merely signifies that substantially all of the particles will pass through a 20 mesh screen and be retained on a 150 mesh screen.

In carrying out the process, the mixture should be maintained at a temperature below about 10° C. while adding water to prevent the agglomeration of particles. As hereinafter shown in the examples, the drying of the mixture may be carried out in a number of ways. However, it is preferred to carry out the drying at a temperature below 34° C. while agitating the mixture. By utilizing this technique, the final product will have a very long shelf life. If one uses the other drying techniques, the final product will be readily wettable but will have a rather short shelf life, i.e., about 10 days.

The invention will now be described by reference to the drawing. The figure shows a particle of the cocoa composition produced in accordance with the present invention.

In the drawing the sugar particle 1 is coated with a layer of cocoa 2 which in turn is coated with a thin glassy layer of sugar 3. The cocoa tends to smear out on the sugar particle giving a thin discontinuous layer.

The following examples are given to illustrate the invention and are not intended to limit it in any manner. All parts are given in parts by weight unless otherwise expressed.

EXAMPLE 1

Procedure A

To a Hobart mixer is added 100 grams of cocoa powder (11% fat), 400 grams of −100 mesh cane sugar (sucrose), 5 grams of crushed Dry Ice and 40 grams (8%) of water. The Dry Ice is added to keep the temperature below about 5° C. The mixture is stirred for about 15 minutes until the temperature rises from 0° C. to about 20° C.

Procedure B

To the 540 grams of the resulting mixture of cocoa and sugar are added 400 grams of ¼ inch balls of non-attriting silica gel. The resulting mixture is tumbled in a ceramic crock for one hour and then sieved through a 20 mesh screen to remove the silica balls. The silica balls can be dried at 200° C. for 30 minutes for reuse.

The resulting product has a bulk density of 0.9 grams/cc. and a sinking time in cold milk of about 1 second. The product is non-caking and free-flowing after one month storage. The residue (from a 12 gram sample) on a 60 mesh screen after 7 seconds stirring in 5° C. milk is about 0.5 grams. When the product is examined under the microscope it can be seen that the cocoa has coated the sugar granules and that substantially no cocoa appears in the composition as separate discrete particles. The cocoa on the granules has a glassy surface showing that the sugar has coated the cocoa with a thin glassy layer of sugar (amorphous).

EXAMPLE 2

Procedure A of Example 1 is repeated in order to obtain the cocoa, sugar and water mixture.

The 540 grams of the resulting mixture are put in a fluidized bed and dried with dry air at room temperature (20° C.). The air is dried by passing it through a column of silica gel. After about 20 minutes, the moisture content of the mixture has dropped from about 8% to about 1%. The mixture is then removed from the fluidized bed.

The resulting product has a bulk density of 0.9 grams/cc. and a sinking time in cold milk of about 10 seconds. The product is non-caking and free-flowing after one month storage. The residue (from a 12 gram sample) on a 60 mesh screen after 7 seconds stirring in 5° C. milk is about 1 gram. When examined under the microscope, the product is essentially the same as that described in Example 1.

EXAMPLES 3 THROUGH 10

Procedure A and procedure B of Example 1 is repeated employing varying amounts of water. The water is employed in amounts of 10 grams (2%), 20 grams (4%), 30 grams (6%), 40 grams (8%), 45 grams (9%), 50 grams (10%), 55 grams (11%) and 60 grams (12%).

The composition is readily wettable throughout the ranges of 30 to 55 grams (6 to 11%) of water. When 20 grams (4%) of water is utilized the product has improved wettability but would not be commercially acceptable as instant cocoa due to the marginal improvement in wettability. At 60 grams (12%), the product has improved wettability but would not be acceptable for a commercial instant cocoa. The excess water causes a fudge-like consistency that is difficult to handle and dry. A particularly preferred product is produced using a 40 to 50 grams (8 to 10%) of water. The products resulting from the use of from 20 grams (4%) to 60 grams (12%) look essentially the same as that described in Example 1 when they are examined under the microscope.

At 10 grams (2%) of water the product has no noticeable increase in wettability. When examined under the microscope, the cocoa particles project from the surface rather than being coated unto the sugar.

EXAMPLES 11 THROUGH 19

Procedure A and procedure B of Example 1 is repeated employing varying amounts of cocoa and sugar. All other conditions remain the same.

| Example | Cocoa, percent | Sugar, percent | Comments |
| --- | --- | --- | --- |
| 11 | 10 | 90 | Improved wettability but too little cocoa. |
| 12 | 20 | 80 | Excellent wettability, excellent product. |
| 13 | 30 | 70 | Excellent wettability, good product. |
| 14 | 40 | 60 | Do. |
| 15 | 50 | 50 | Excellent wettability, fair product. |
| 16 | 60 | 40 | Slightly improved wettability, poor product. |
| 17 | 70 | 30 | Poor wettability, poor product. |
| 18 | 80 | 20 | Do. |
| 19 | 90 | 10 | Do. |

When the products containing 10 to 60% of cocoa are examined under the microscope they look essentially the same as the product of Example 1. The product containing 70, 80 and 90% of cocoa shows rough cocoa particles on the surface rather than layers of cocoa as described in Example 1 and shown in the drawing.

EXAMPLE 20

Procedure A of Example 1 is repeated in order to obtain the cocoa, sugar and water mixture.

The 540 grams of the resulting mixture is put in a fluidized bed and dried with air heated to a temperature of 230° F. After about 20 minutes, the moisture content of the mixture has dropped from about 8 to about 1%. The mixture is then removed from the fluidized bed.

The resulting product has a bulk density 0.9 grams/cc. and a sinking time in cold milk of about 10 seconds. The residue (from a 12 gram sample) on a 60 mesh screen, after 7 seconds stirring in 5° C. milk, is about 1 gram. When examined under the microscope, the product is essentially the same as that described in Example 1.

After about 10 days storage in a sealed glass container, the wettability decreases substantially. The example shows that while various methods of drying may be utilized, it is preferred to dry at a low temperature with silica gel or dry air.

EXAMPLE 21

Procedure A of Example 1 is repeated in order to obtain the cocoa, sugar and water mixture.

The 540 grams of the resulting mixture are put in a pan in a dead air oven at a temperature of about 230° F. After about 10 minutes the moisture content of the mixture has dropped from about 8% to about 1%. The mixture is then removed from the oven and the resulting cake is broken up into fine pieces.

The resulting product has substantially the same characteristics as the product of Example 20 including the loss of wettability after about 10 days storage in a sealed glass jar. The example again shows that the preferred method for making a readily wettable product is the use of dry air or silica gel at a low temperature. However, if the product is to be utilized within about 10 days, the procedure of either Example 20 or 21 could be used.

Many equivalent modifications will become apparent to those skilled in the art from a reading of the foregoing without a departure from the inventive concept.

What is claimed is:

1. A process for forming a readily wettable cocoa composition which comprises mixing from about 4 to about 12% by weight of water with a composition containing from about 10 to about 60% by weight of cocoa powder and from about 90 to about 40% by weight of sugar while maintaining the mixture at a temperature below about 10° C. and thereafter drying the mixture.

2. A process for forming a readily wettable cocoa composition which comprises mixing from about 4 to about 12% by weight of water with a composition containing from about 10 to about 50% by weight of cocoa powder and from about 90 to about 50% by weight of sugar while maintaining the mixture at a temperature below about 10° C. and thereafter simultaneously agitating and drying the mixture at a temperature below 34° C.

3. A process for forming a readily wettable cocoa composition which comprises mixing from about 6 to about 11% by weight of water with a composition containing from about 10 to about 50% by weight of cocoa powder and from about 90 to about 50% by weight of sugar while maintaining the mixture at a temperature below about 10° C. and thereafter drying the mixture by tumbling the mixture with silica gel particles at a temperature below about 34° C.

4. A process for forming a readily wettable cocoa composition which comprises mixing from about 6 to about 11% by weight of water with a composition containing from about 10 to about 50% by weight of cocoa powder and from about 90 to about 50% by weight of sugar while maintaining the mixture at a temperature below about 10° C. and thereafter drying the mixture by agitating the mixture with dry air at a temperature below 34° C.

5. The process of claim 3 wherein the water is added in amounts of from about 8 to about 10%.

6. The process of claim 4 wherein the water is added in amounts of from about 8 to about 10%.

References Cited

UNITED STATES PATENTS

| | | | |
|---|---|---|---|
| 3,006,763 | 10/1961 | Marcy et al. | 99—26 |
| 3,028,242 | 4/1962 | Hale et al. | 99—26 |
| 3,053,663 | 9/1962 | Donahue | 99—24 X |
| 3,085,879 | 4/1963 | Wadsworth et al. | 99—26 |
| 3,385,710 | 5/1968 | Reymond et al. | 99—23 X |

FOREIGN PATENTS 1,114,694  10/1961  Germany.

LIONEL M. SHAPIRO, Primary Examiner

D. M. NAFF, Assistant Examiner

U.S. Cl. X.R.

99—141